INVENTORS.
CHARLES PAIST.
BY DONALD W. SIBAL.
DONALD V. CLAY.

ATTORNEYS.

May 7, 1963

C. PAIST ETAL 3,088,381

MACHINE FOR APPLYING METAL STAYS TO CARTONS

Filed April 4, 1960

INVENTORS.
CHARLES PAIST.
BY DONALD W. SIBAL.
DONALD V. CLAY.

Ward, Neal, Haselton, Orme & McChannon
ATTORNEYS.

May 7, 1963

C. PAIST ETAL 3,088,381

MACHINE FOR APPLYING METAL STAYS TO CARTONS

Filed April 4, 1960

INVENTORS
CHARLES PAIST.
BY DONALD W. SIBAL.
DONALD V. CLAY.

Ward, Neal, Haselton, Orme McChannon
ATTORNEYS.

May 7, 1963 C. PAIST ETAL 3,088,381
MACHINE FOR APPLYING METAL STAYS TO CARTONS
Filed April 4, 1960 10 Sheets-Sheet 10

INVENTORS.
CHALES PAIST.
DONALD W. SIBAL.
DONALD V. CLAY.
BY Ward, Neal, Haselton, Orme & McElhannon
ATTORNEYS.

United States Patent Office 3,088,381
Patented May 7, 1963

3,088,381
MACHINE FOR APPLYING METAL STAYS
TO CARTONS
Charles Paist, Linwood, N.J., and Donald W. Sibal, Marshall, and Donald V. Clay, Grand Rapids, Mich., assignors to St. Regis Paper Company, New York, N.Y., a corporation of New York
Filed Apr. 4, 1960, Ser. No. 19,655
12 Claims. (Cl. 93—41.1)

This invention relates to box making machinery, and more particularly, to machinery for applying metal stays to the adjacent regions of the side flaps of paperboard or cardboard box blanks to form box corners.

It is known in the art to apply metal stays to the corners of boxes, but heretofore machinery for performing such an operation has involved certain difficulties and disadvantages. Thus, in setting up the box blanks male and female dies have been used, but in attempting to utilize such an expedient at high speeds in the formation of boxes of kraftboard it has been found that the friction encountered is sufficient to scorch the board. For this and other reasons, metal stays have often been applied to the corners of box blanks by a treadle operated machine in which the operator sets up the blank by hand, mounts a corner of the box on an anvil and presses the treadle in order to actuate the metal stay applying parts of the machine. After application of the stay to one corner, the box is released and rotated by hand until the next corner is in position on the anvil and the procedure is repeated until all the corners have been stayed. A further important disadvantage associated with metal stay applying machinery of the treadle operated type has been the amount of time spent prefolding the boxes by hand into the configuration necessary before the stays could be applied to the box corners.

The present invention has for its particular purpose a contribution of means that make possible the setting up of box blanks, the simultaneous application of metal stays to each of the corners thereof and the ejection of the stayed box from the machine, all entirely automatically and at high speed, while additionally providing for the rapid change-over from one box size to another.

As a feature of the present invention, the machine is divided into a number of quadrants, four for example, and each quadrant is provided with novel means for feeding a predetermined length of metal stay from a supply thereof of indefinite continuous length, means for cutting and bending said stay and means for applying the cut portions of said stay to the corner regions of a set-up box blank.

A further feature of the present invention resides in the means utilized for receiving and setting up scored and cornered box blanks to receive the stays. This novel construction comprises generally a mandrel for supporting the body of a box blank with the flaps overextending the same, a frame movable relatively to the mandrel and carrying slide means for contacting the body of the blank upon movement of the frame towards the mandrel, the slide means sliding relatively to the frame upon further movement of the frame towards the mandrel, and flap bending means carried by the slide means and movable relatively thereto upon the aforementioned further movement to fold the flaps along the edges of the mandrel into set-up condition. The flap bending means are preferably in the form of pads pivoted to the slide means and links are provided connecting the pads and the frame, the links actually contributing the pivotal movement to the pads upon the continuation of the movement of the frame towards the mandrel after movement of the slide means in the same direction has been stopped by the slide means coming into contact with the body of the box blank. Several of the pads, preferably at least a pair of opposed pads, are provided with means for engaging portions of the side flaps when the same are in set-up condition so as to facilitate removal of the box from the mandrel after the metal stays have been applied to the corners thereof. The box forming means is thus adapted to serve also to move the stayed box from the mandrel into position to be acted upon by ejecting means.

As a further important feature of the present invention, the machine is provided with means enabling the same to be rapidly and conveniently changed over from one box size to another. The strip feeding and applying mechanism referred to as being disposed in four quadrants, for example, may be adjusted horizontally by pairs; that is, the mechanism in the first and second quadrants, on the one hand, and in the third and fourth qudrants, on the other hand, may be moved horizontally towards and away from one another while the mechanism in the first and fourth quadrants and in the second and third quadrants may similarly be moved horizontally towards and away from one another, thus providing universal positioning of the stay applying apparatus and enabling the machine to accommodate square or rectangular boxes, for example, of various sizes limited only by the size of the machine as manufactured. Thus, for example, a machine has actually been constructed and successfully operated based upon the present concept and adapted to accommodate boxes ranging from 1⅞" square to 20" square, it being appreciated by those persons skilled in the art that the maximum limitations can readily be extended in larger machines. In this connection, the minimum depth of the boxes is about 11/16 of an inch since this is the minimum depth of two eyelets of stay, it having been found that a depth equivalent to but a single eyelet renders the stay difficult to control. The maximum length of stay is of course without limit and may also be adjusted in accordance with the desired box depth.

There has thus been outlined rather broadly the more important features of the present invention in order that the detailed description thereof that follows may be better understood, and in order that our contribution to the art may be better appreciated. There are, of course, additional features of the invention that will be described hereinafter and which will form the subject of the claims appended hereto. Those skilled in the art will appreciate that the concept on which the present disclosure is based may readily be utilized as a basis for the designing of other structures for carrying out the several purposes of the invention. It is important, therefore, that the claims be regarded as including such equivalent constructions as do not depart from the spirit and scope of the present invention, in order to prevent the appropriation of the invention by those persons skilled in the art.

A specific embodiment of the invention has been chosen for purposes of illustration and description, and is shown in the accompanying drawings, forming a part of the specification, wherein.

Figures 1, 2, 3, 18:
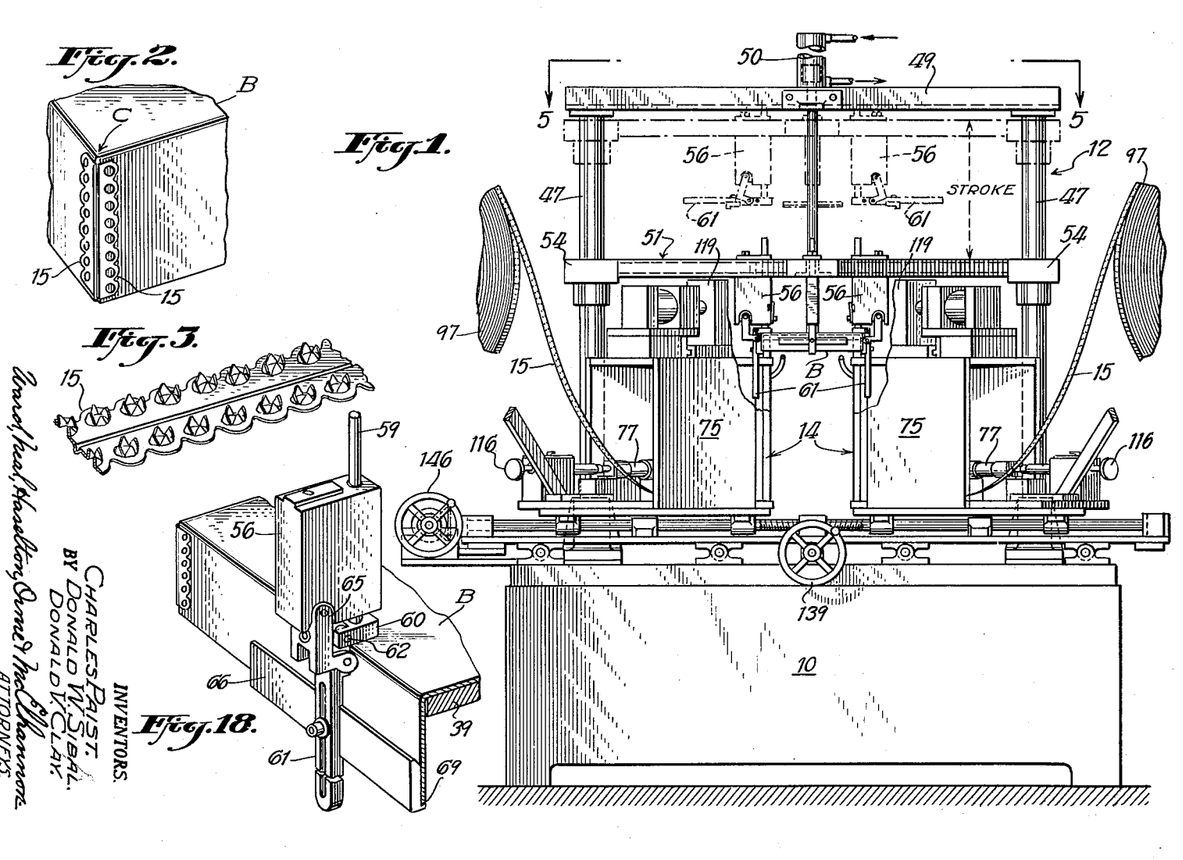
FIG. 1 is an elevational view of the machine with parts thereof broken away for better illustration and showing portions of the box forming apparatus in projected position, and in retracted position in broken lines.
FIG. 2 is a fragmentary perspective view illustrating a corner of a typical box with a metal corner stay applied thereto and overlapping adjacent regions of two of the box flaps.
FIG. 3 is a perspective view of a portion of a typical metal stay.
FIG. 18 is a fragmentary perspective view of the apparatus shown in FIGS. 16 and 17.
Figure 4:
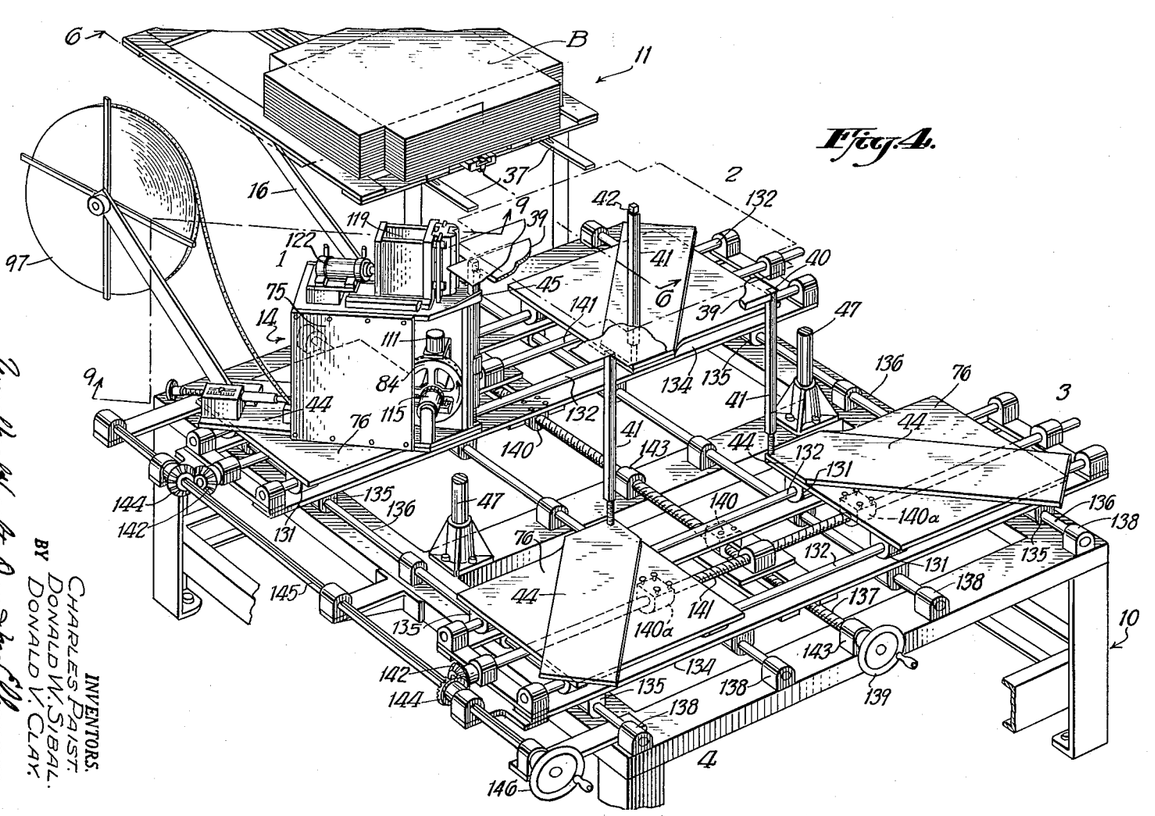
FIG. 4 is a perspective view of a portion of the machine with parts thereof removed to better illustrate certain features thereof.

Referring now to the drawings, and more particularly to FIGS. 1 to 4 thereof, there is shown a preferred embodiment of the present invention comprising a frame 10 supporting a box blank feeder 11 (FIG. 4), forming means 12 for receiving individual blanks from the feeder 11, and stay applying means designated generally by the reference numeral 14, for feeding and simultaneously applying metal stays 15 (FIGS. 2 and 3) to adjacent regions of the set-up side flaps of the blanks B to form box corners, as at C (FIG. 2). The blanks B may be scored to facilitate bending of the flaps, and are cornered as shown in FIG. 4.

Figures 6, 7, 8:
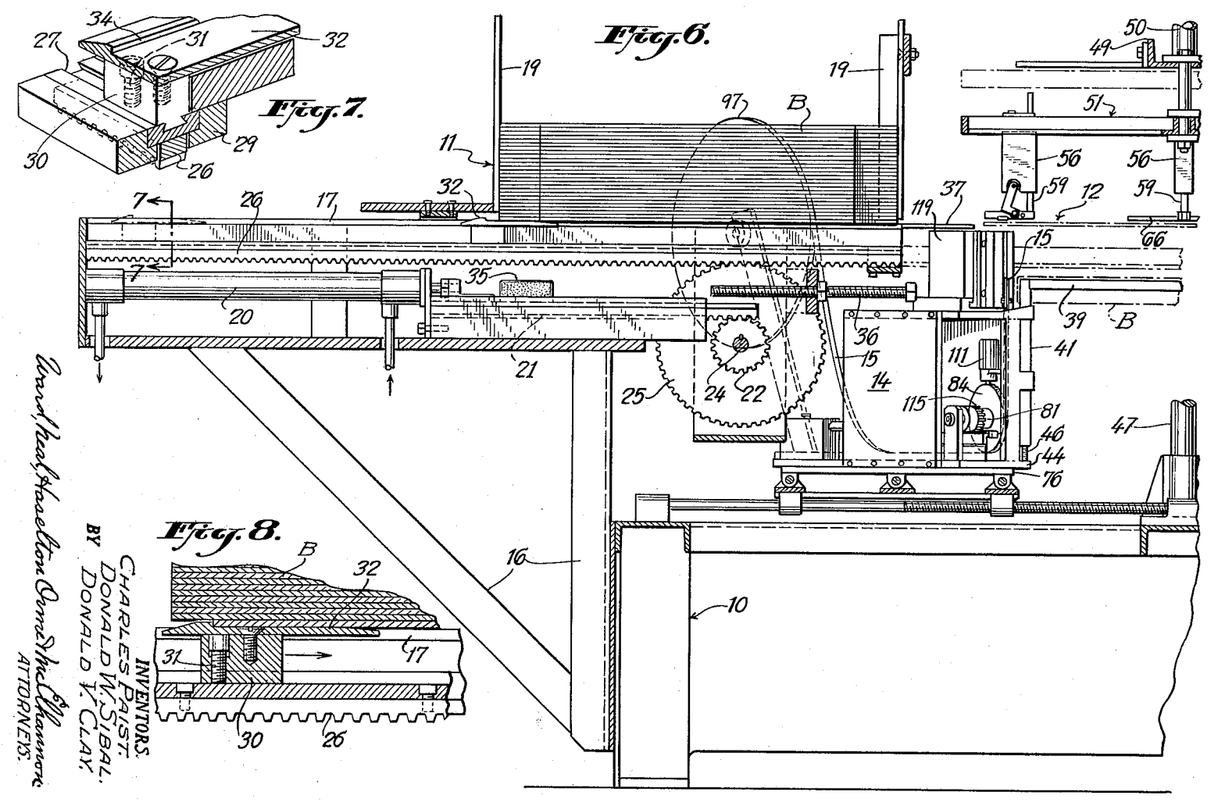
FIG. 6 is a cross-sectional view taken along the lines 6—6 of FIG. 4.
FIG. 7 is a cross-sectional view taken along the lines 7—7 of FIG. 6.
FIG. 8 is a fragmentary cross-sectional view taken along the lines 8—8 of FIG. 7.

As shown in FIGS. 4 and 6, the feeder 11 may conveniently be supported from the main frame 10 by bracket members 16, and consists generally of a platform 17 and corner irons 19 which are adjustable to support box blanks of various sizes on the platform. The actual feeding mechanism includes a hydraulic ram 20 the piston rod of which is formed of a toothed rack 21 in engagement with a pinion 22 mounted on a shaft 24 along with a larger pinion 25 the teeth of which are enmeshed with those of a rack 26 mounted for reciprocating movement in the channel 27 of an elongate block 29. A carrier 30 is fitted for longitudinal adjustment relatively to the rack 26 as by a dove-tail mortise and tenon joint as shown in FIG. 7, and a set screw 31 secures the carrier in the desired position along the length of the rack. Suitably secured atop the carrier 30 is a feeder plate 32 formed with an upstanding shoulder 34. The right hand end of the feeder plate is preferably tapered to a relatively thin edge, as shown in FIGS. 6 and 8. It will be seen that the rack 26 and its carrier 30 and plate 32 are positioned for movement by the ram 20 beneath the stack of blanks B.

From the description thus far, it will be apparent that as the ram 20 moves the rack 21 to the right, as viewed, the pinion 22, shaft 24 and pinion 25 are rotated in a clockwise direction, thus driving the rack 26, carrier 30 and plate 32 to the right, as viewed. The shoulder 34 engages the trailing edge of the lowermost blank B and slides it out from under the stack and towards the forming means 12. When the rack 26 has moved a predetermined distance, the ram 20 is reversed by suitable control means (not shown) and the plate 32 returns to pick up the next blank. The carrier 30, and therefore the plate 32 is adjusted relatively to the rack 26 depending upon the size of blanks being handled. To assure positive and sudden stopping of the plate 32, a bumper 35 is mounted on the rack 21 and strikes an adjustable screw 36 mounted on the frame. This sudden stopping action serves to throw the blank through the last portion of its travel towards the forming means so that the rack need not travel the full distance and may be reversed earlier than otherwise to clear the way for the operation of the forming means that much sooner.

Guide plates 37, best shown in FIGS. 4 and 6, support the blanks as they move towards the forming means and are laterally adjustable for accommodation of different sized blanks.

Figure 23:
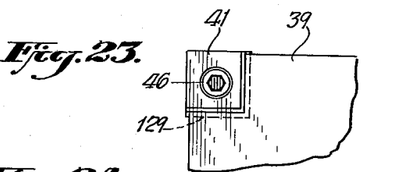
FIG. 23 is a top plan view similar to FIG. 21 but illustrating the application of a shim between the mandrel and its supporting post to enable the same machine to fold and stay box tops for use in connection with boxes also accommodated by the machine.
Figure 24:
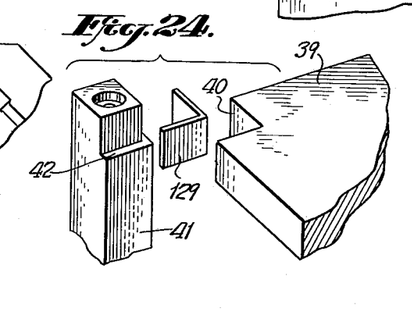
FIG. 24 is a perspective exploded view illustrating the relationship of the mandrel, a supporting post therefor and a shim applicable between the mandrel and its supporting post for adapting the machine to fold and stay box tops.

Turning now to FIGS. 1 and 4, the forming means will be seen to comprise a mandrel and means for bending the side flaps of the blanks into set-up condition for reception of the stays. Thus, the mandrel may be a flat metal plate 39 cornered as at 40 and shown in fragment in FIG. 4 (see also FIG. 23). The mandrel also includes four vertically disposed hollow posts 41 shouldered near the upper ends thereof, as at 42 (FIG. 24), to provide support for the plate 39. Each of the posts 41 bears against the surface of a supporting member 44 and is held in vertical disposition by guides 45 formed on the frames or housings of the stay applying mechanism 14. The bore of each post contains an adjusting bolt 46 by which the elevation of the posts, and therefore of the plate 39, may be altered. For any particular box size, the relationship of the plate 39 and the blank B is such that the flaps of the blank over-extend the side edges of the plate so that the same may be folded downwardly thereabout.

Figure 5:
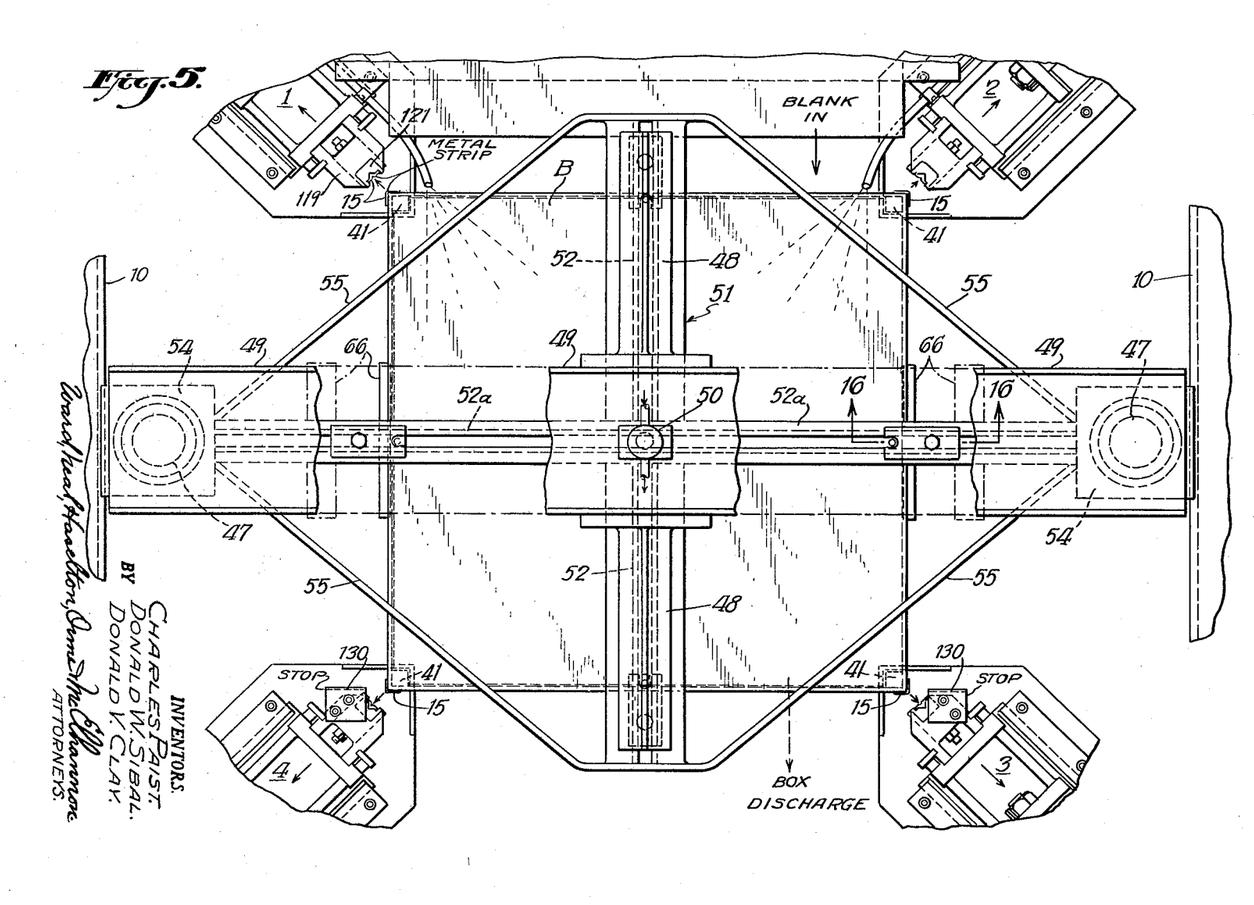
FIG. 5 is a fragmentary plan view taken along the lines 5—5 of FIG. 1.

The flap bending means comprises a sub-frame mounted upon the main frame 10 and including a pair of upright, cylindrical posts 47, as best shown in FIGS. 1, 4 and 5, supporting a beam 49 at the top thereof. This beam 49, in turn, supports wings 48 extending outwardly at right angles to the center thereof so as to present a cross-form with the beam 49. The beam 49 also supports a vertically disposed hydraulic ram 50 at the center thereof the piston rod of which extends downwardly therefrom and is connected to a cross-frame 51 which includes a pair of beams 52 and 52a centrally intersecting each other at 90 degrees. The ends of the beam 52a are provided with collars 54 embracing the vertical posts 47 so that the cross-frame 51 while movable vertically by the ram 50 is guided in that movement by the posts 47. Angular braces 55 may be provided extending between the ends of the beams 52 and 52a for adding strength to the cross-frame.

Each of the beams 52 and 52a carries a block 56 which is adjustable along the length of its respective beam by means of a suitable slot and bolt connection, for example, whereby when the bolt is tightened down the blocks become, in effect, an intergral part of the beam at the particular selected position.

Figures 16, 17:
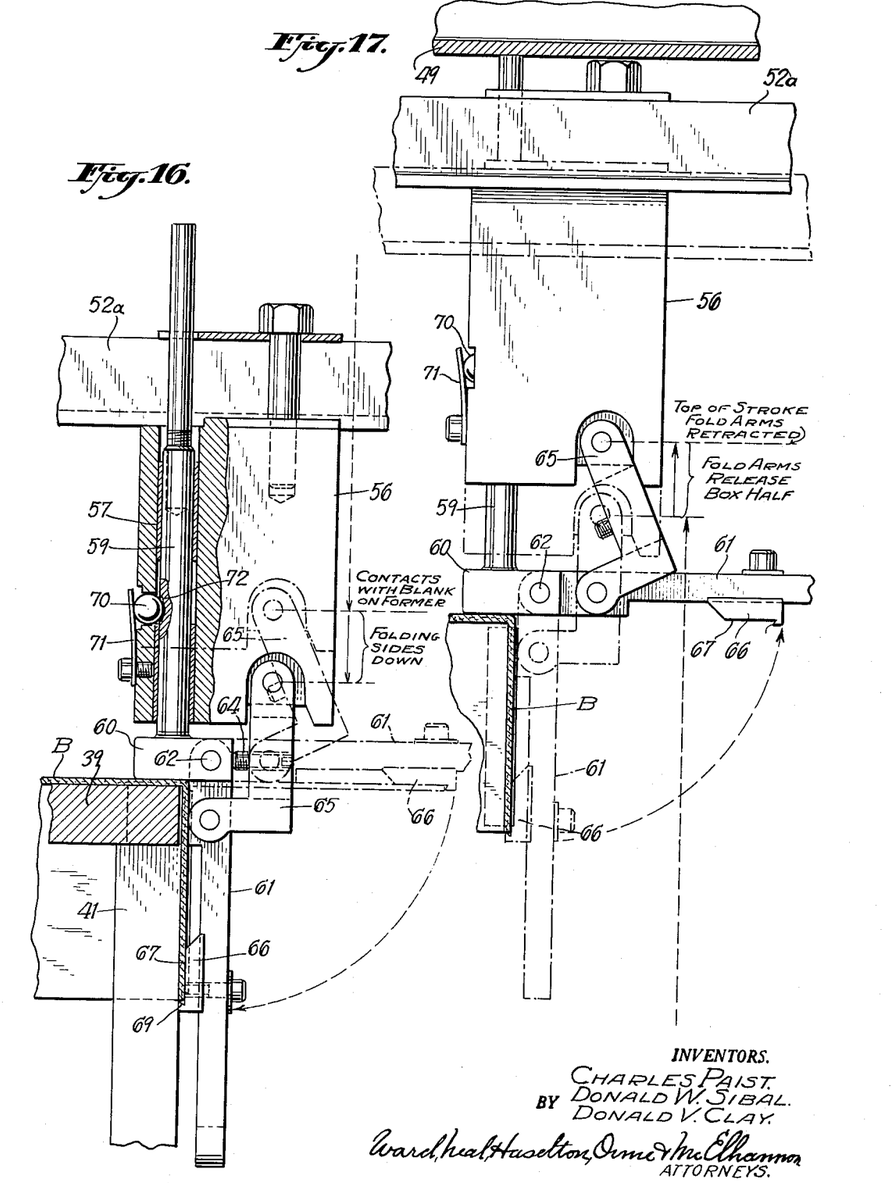
FIG. 16 is a fragmentary cross-sectional view of a portion of the flap bending means and showing the pads in their extreme positions.
FIG. 17 is a view similar to FIG. 16 but showing the flap bending mechanism during the retracting portion of its cycle.

Turning now to FIGS. 16, 17 and 18, it will be seen that each of the blocks carried by the beam 52a is bored and bushed as at 57 and carries a rod 59 which is slideable relatively to the bushing and has an enlarged head 60 at the lower end thereof. A rod 61 is connected to the head 60 by a pivot 62, and may conveniently carry a stop screw 64 which limits its upward pivotal movement to a position substantially horizontal, for example, as shown in broken lines in FIG. 16 and in solid lines in FIG. 17.

Forked links 65, L-shaped in profile, are pivoted at one end to each block 56, and at the other end to the rod 61, for a purpose to be described hereinafter, and the rod 61 carries a pad 66 whic his adjustable thereon by a slot and bolt connection. The pads 66 supported by the blocks mounted on the beam 52a are formed with a flat flap-engaging surface 67 and a shoulder 69 all for a purpose to be described.

The beam 52 is provided with equipment similar to that described in connection with beam 52a except that the pads 66 thereof are not shouldered as at 69.

From the description of the flap bending means as presented thus far, it will be seen that the cross-frame 51 is movable vertically on the posts 47 by the ram 50 and that a block 56 is adjustably supported on each of the four legs of the cross-frame. Each of the blocks 56 carries a rod 59 which is slideable vertically relatively to the block itself and which is provided at its lower end with a head 60. As the cross-frame is moved downwardly towards the plate 39, the rod 59 and its head 60 will, of course, move downwardly with it. However, for any given box size, the blocks 56 are so positioned on the beams 52, 52a that during the downward excursion of the block 56 the heads 60 will come into contact with a box blank B in position on the plate 39 to be acted upon by the flap bending means. The heads 60 strike the blanks B along the marginal portions thereof inwardly of the flaps so that further downward movement of the heads 60 is prevented while the blocks 56 continue to move downwardly; whereby the links 65 cause the rods 61 to pivot about the pivot pins 62 thus moving the flaps downwardly to the position shown in FIGS. 16, 17 and 18 for example. At this point it should be noted that the shoulders 69 engage the end edges of a pair of opposed flaps.

The rods 59 may conveniently be releasably locked in vertical position against movement relatively to the blocks 56 by detents comprising balls 70 biased by springs 71 towards recesses 72 formed in the rods.

When the flaps are bent downwardly into the positions illustrated, the metal stays are applied to the end regions of adjacent flaps to form corners by the stay applying means 14, which will be described in detail hereinafter.

Upon completion of the stay applying operation, the ram 50 is actuated by suitable means (not shown) to raise the cross-frame 51. Since the shoulders 69 of two of the pads 66 engage the downwardly facing edges of their respective flaps, it will be appreciated that as the cross-frame 51 is raised these shoulders will serve to strip the boxes off the mandrel comprising the plate 39 and the posts 41. As the cross-frame continues its upward movement, the upper ends of the rods 59 strike against the lower surfaces of the wings 48 and beam 49. Thus, the rods 59 can no longer move upward and the force of the ram 50 effects release of the rod by the detents 70 so that the blocks 56 continue to move upward relatively to the rods. The links 65 therefore pivot the rods 61 about the pins 62 bringing them to a horizontal position as shown in FIG. 17. This movement of the rods 61 disengages the shoulders 69 from the edges of the flaps of the box flap thus releasing the cornered and stayed box which is then acted upon by ejecting means which will later be described.

Figure 9:
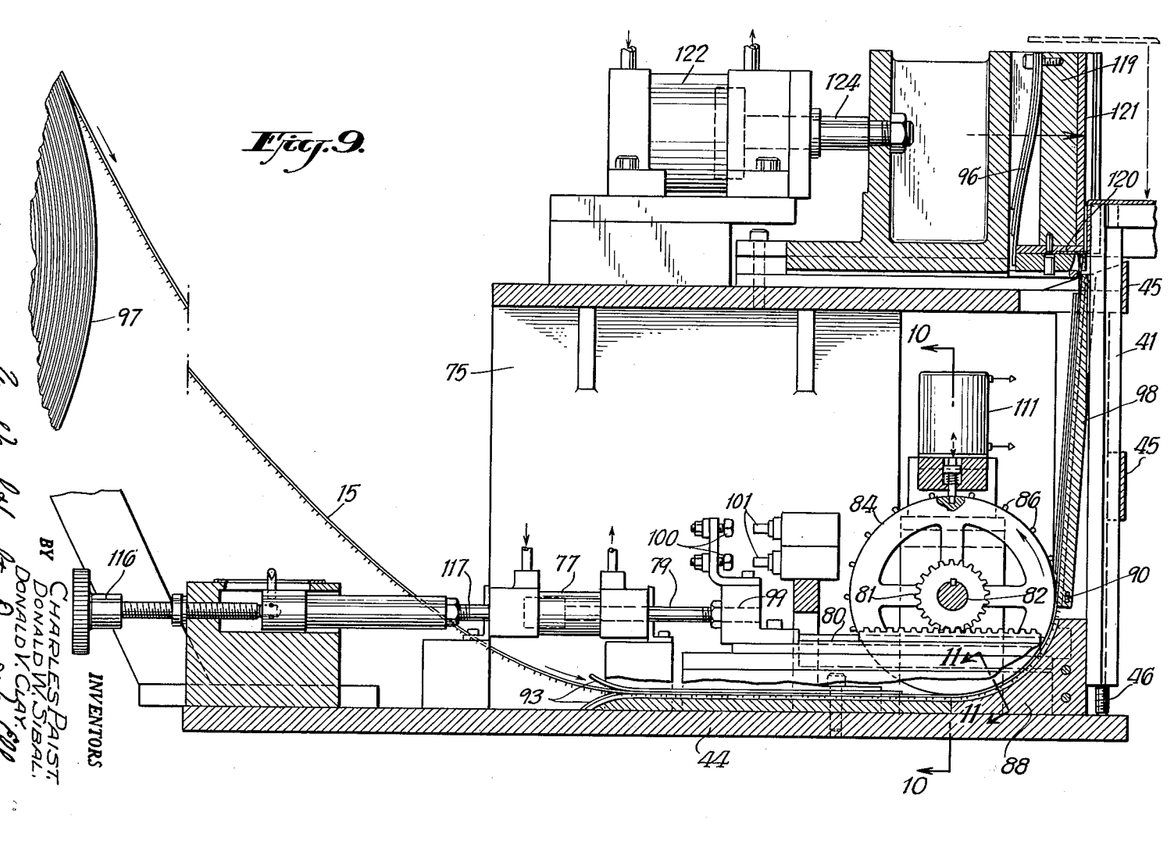
FIG. 9 is a cross-sectional view taken along the lines 9—9 of FIG. 4.
Figures 10, 11:
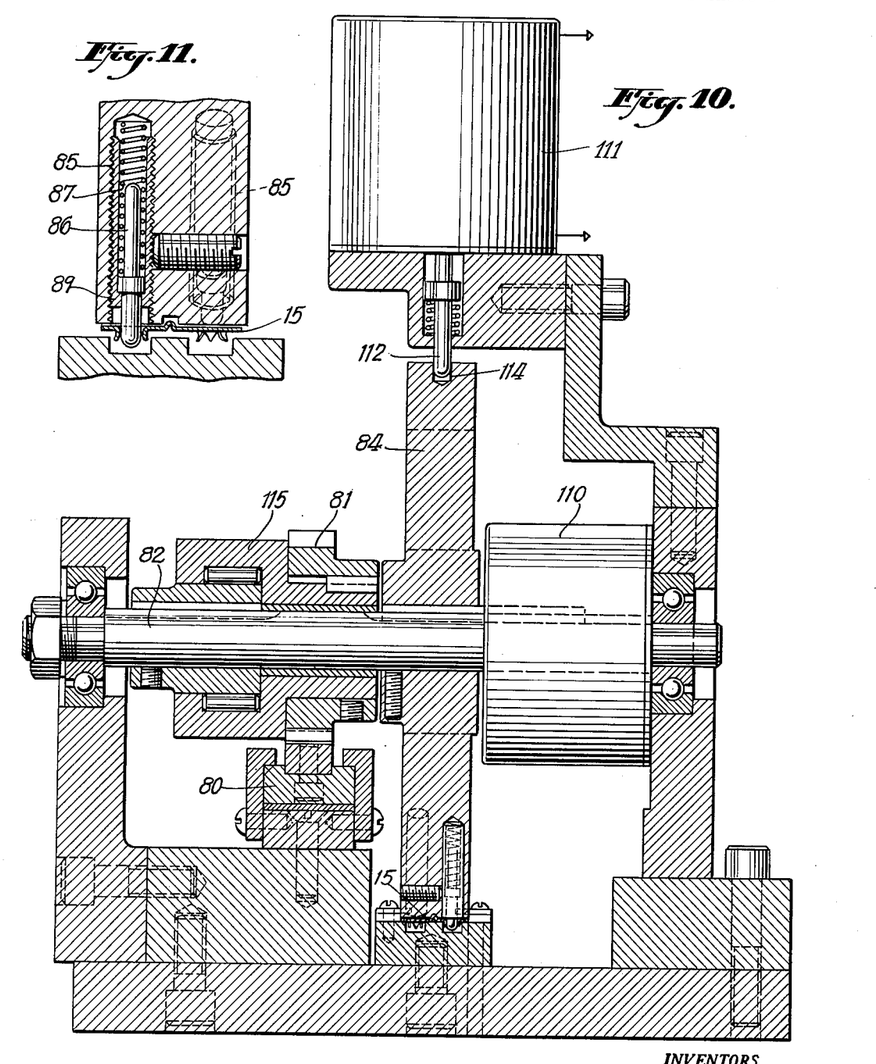
FIG. 10 is a cross-sectional view taken along the lines 10—10 of FIG. 9.
FIG. 11 is a fragmentary cross-sectional view taken along the lines 11—11 of FIG. 9.
Figures 12, 13, 14, 15:
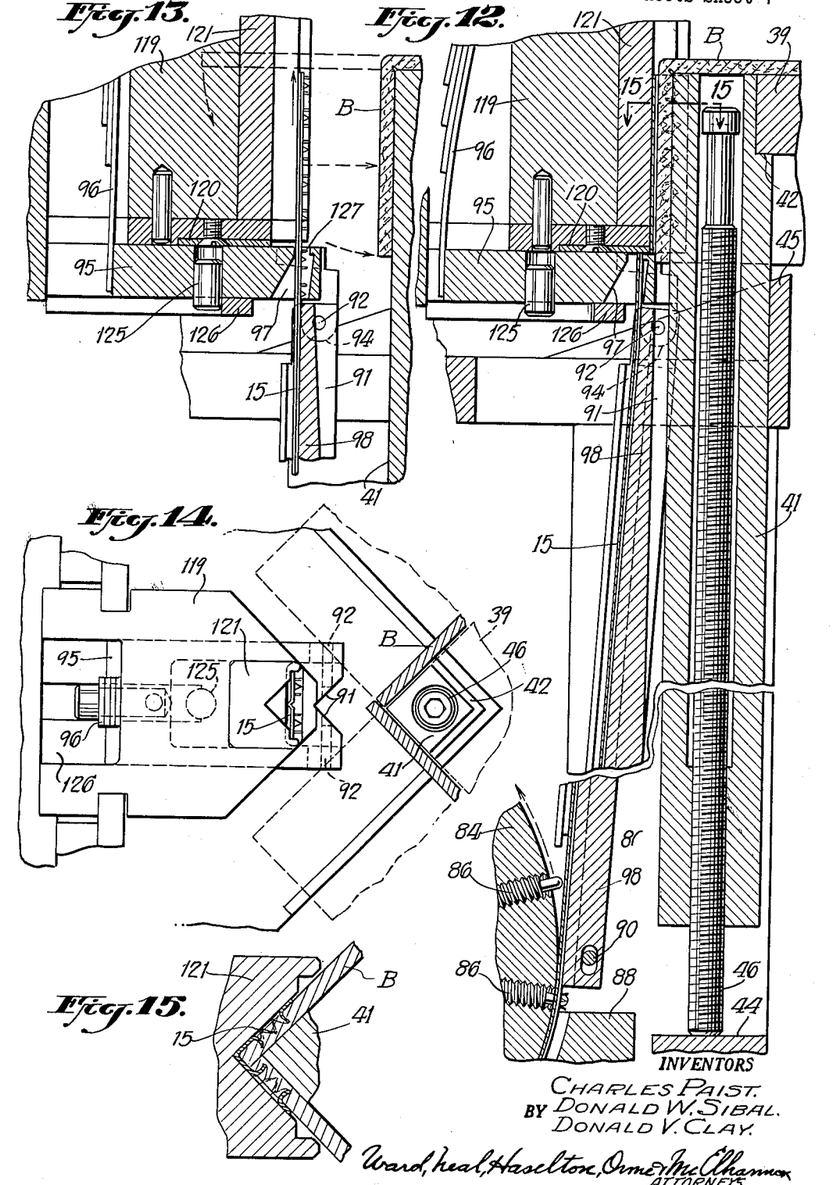
FIG. 12 is an enlarged fragmentary cross-sectional view of the right hand portion of FIG. 9.
FIG. 13 is an enlarged view of a portion of the apparatus illustrated in FIG. 12 but showing the stay cutting blade in retracted position.
FIG. 14 is a fragmentary plan view of a portion of the stay applying apparatus.
FIG. 15 is a cross-sectional view taken along the lines 15—15 of FIG. 12.

Referring now to FIGS. 4, 5 and 9 to 15, there are shown various features of the invention relating to the stay applying means indicated generally by the reference numeral 14, as in FIG. 4 for example. Since the invention is being described in connection with the formation of four-cornered boxes, four metal stay-applying means 14 are required, but since each of these means is identical, it will suffice to describe only one in detail. As shown in FIG. 4, the metal stay applying means 14 comprises a housing 75 mounted on the supporting member 44 which is in turn carried by a rectangular bed 76. As best shown in FIG. 9, the housing 75 contains a hydraulic ram 77 the piston 79 of which is connected to a rack 80 for reciprocating movement thereof. The teeth of the rack 80 engage those of a pinion 81 mounted on a shaft 82 for rotation thereof. The shaft 82 also has keyed to it a sprocket wheel 84 for rotation therewith. The sprocket 84 is provided with a series of radial bores 85 staggered relatively to one another, as best illustrated in FIG. 11. Each bore 85 is provided with a pin 86 and a spring 87 which bears against the shoulder on the pin and urges the same outwardly against the plug 89 which is so positioned in the bore as to locate the ends of the pin slightly beyond the sprocket perimeter. The housing 75 also supports a metal block 88 which in turn supports guide strips 93 for conducting the metal stay 15 from a supply coil 97 to a portion of the block 88 which curves along a path adjacent to a portion of the perimeter of the sprocket 84 to bring the metal stay 15 into position for engagement of pins 86 in the apertures in the stay. An elongate track 98 extends upwardly from a position adjacent the upper end of the curved portion of the block 88 and is supported for pivotal movement by a pin 90 mounted in the housing. As shown in FIGS. 12 and 13, the upper end of the track 98 is recessed as at 91 along its leading edge and is pivoted by the pivot pin 92 to depending lugs 94 of a floating plate 95 which is urged by a flat spring 96 in the direction of the post 41. The plate 95 has an opening 97 therein in which the stay 15 may pass on its way to the cutting, shaping and applying head.

Referring again to FIG. 9, the piston rod 79 includes a support 99 for a pair of electrical contacts 100 which reciprocate with the piston rod relatively to a complementary pair of contacts 101. Upon actuation of the ram 77 to protract the piston rod 79, the rack 80 effects rotation of the pinion 81, the shaft 82 and the sprocket 84 in a counter-clockwise direction. The pins 86 projecting through the apertures in the stay advance the stay along the track member 98 towards the cutting head a lineal distance dependent upon the degree of angular rotation of the sprocket 84. As the contacts 100 meet the contacts 101 an electrical circuit is completed controlling a brake 110 on the shaft 82 (see FIG. 10) and a solenoid 111 (FIGS. 9 and 10). The circuitry is such that the brake is actuated during protraction of the piston rod 79 and remains so until retraction begins, thus putting a slight drag on the shaft 82. The solenoid 111 is energized just before the piston rod starts to retract thus propelling its armature 112 into one of a series of recesses 114 in the peripheral surface of the sprocket 84 so as to maintain the same in its advanced position.

The solenoid remains energized until the advanced length of stay is cut and applied. As has been stated, rotation of the pinion 81 by the rack 80 effects rotation of the shaft 82. Actually, the pinion 81 is keyed to a oneway clutch 115 which in turn is keyed to the shaft 82 and permits rotation of the shaft in a direction to allow the sprocket to advance the stay 15 but enables the rack 80 to be retracted by the hydraulic ram 77 without causing the sprocket to rotate in a clockwise direction as viewed in FIG. 9. The brake and solenoid may of course be actuated by other convenient means as for example by cam actuated relays not shown in this embodiment. The throw of the ram 77, and thus the length of stay advanced in each cycle, is controlled by an adjusting screw 116 which positions the stop 117 in the ram cylinder.

It has already been stated that the stay 15 is advanced through the opening 97 in the floating plate 95. In FIGS. 9, 12 and 13, a reciprocating block 119 is positioned directly above the plate 95 and carries the flat spring 96 already referred to. This block 119 also carries a cutting blade 120 and an insert 121, the leading edge of which is V-shaped in horizontal section as illustrated in FIGS. 14 and 15. As shown in FIGS. 4 and 9, a hydraulic ram 122 is mounted atop the housing 75 and controls the movement of the block 119 through its piston rod 124. In the operation of the cutting head, after the stay has been propelled through the opening 97 in the plate 95 to the position shown in FIG. 13, the ram 122 drives the block 119, the insert 121 and the cutting blade 120 to the right, as viewed, as indicated by the arrow. Thus, as the V-shaped surface of the insert 121 contacts the surface of the stay, it moves the stay across the width of the opening 97 and against a shoulder 127 constituting a part of the plate 95 so that the cutting of the stay occurs between this shoulder 127 and the lower edge of the blade 120. Additionally, as the severed section of the stay is brought into contact with the post 41, this post serves as an anvil about which the stay is bent by the leading surface of the insert 121 as shown in FIG. 15 while the cleats of the stay are driven into the marginal edges of the respective flaps of the blank B.

The cleats, upon penetrating the blank, are forced outwardly by the force exerted by the rams 120 moving the inserts 121 towards the posts 41, which force may be as high as six to seven tons for a box formed 12 inches deep of 80 point board. As the block 119 advances to sever shape and apply the stay 15, the spring 96 urges the floating plate 95 along in the same direction. As the block 119 is retracted by the ram, a stop 126 carried by the block 119 engages a depending pin 125 carried by the plate 95 and draws the plate to the left as viewed in FIGS. 12 and 13 until it reaches the position illustrated in FIG. 13 whereupon an additional length of stay is propelled by the sprocket 84 into the position shown, to be acted upon by the cutting head.

Figures 19, 19A, 19B, 19C, 19D:
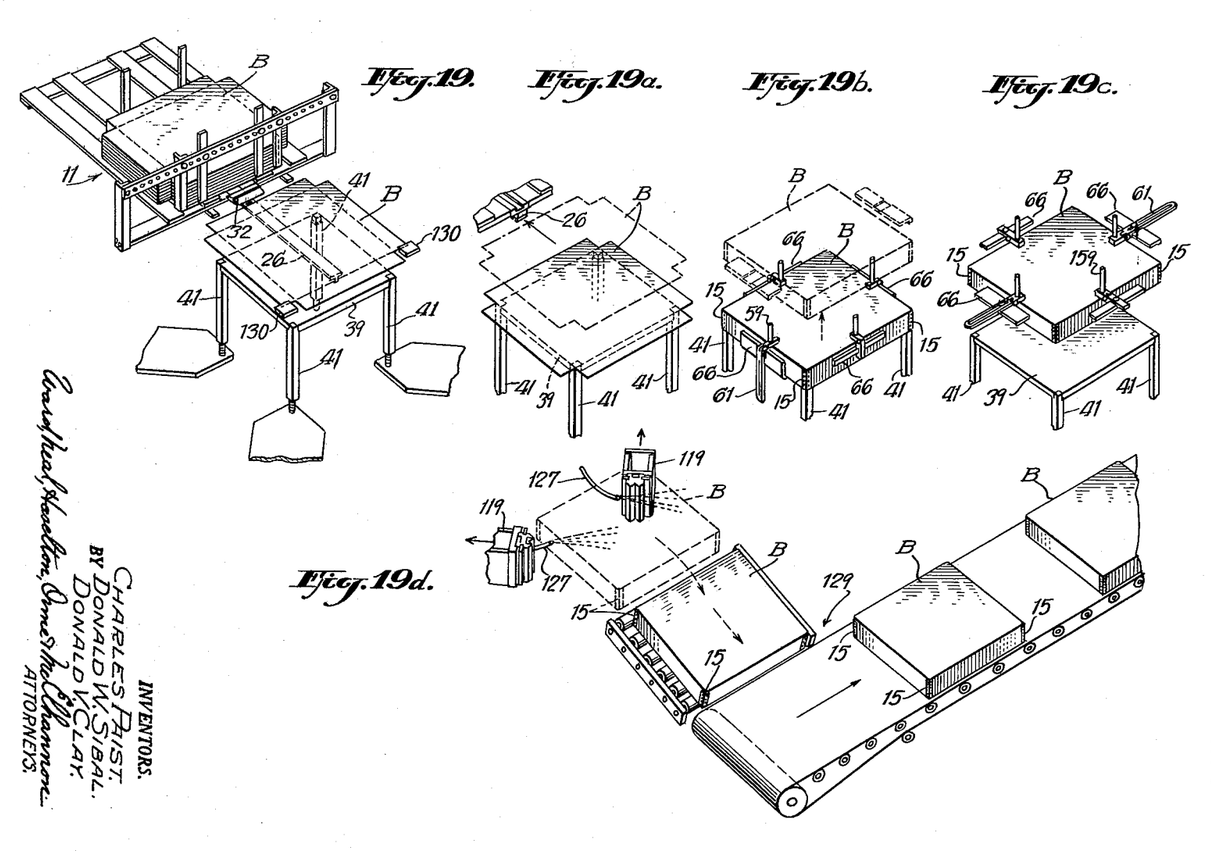
FIG. 19 is an exploded fragmentary perspective view illustrating the relationship of the feeding mechanism, the mandrel and an exemplary box blank as it is fed to the mandrel.
FIG. 19a is an exploded view somewhat similar to FIG. 18 but illustrating the relative positions of the parts as the feeding mechanism is retracted.
FIG. 19b is an exploded view illustrating a formed, stayed box positioned on the mandrel, and further illustrating in phantom the same box lifted from the mandrel and in position to be ejected from the machine.
FIG. 19c is an exploded view illustrating the relationship of the box about to be ejected to the mandrel.
FIG. 19d is a fragmentary perspective view illustrating the ejecting mechanism, and a typical take-away device.
Figure 20:
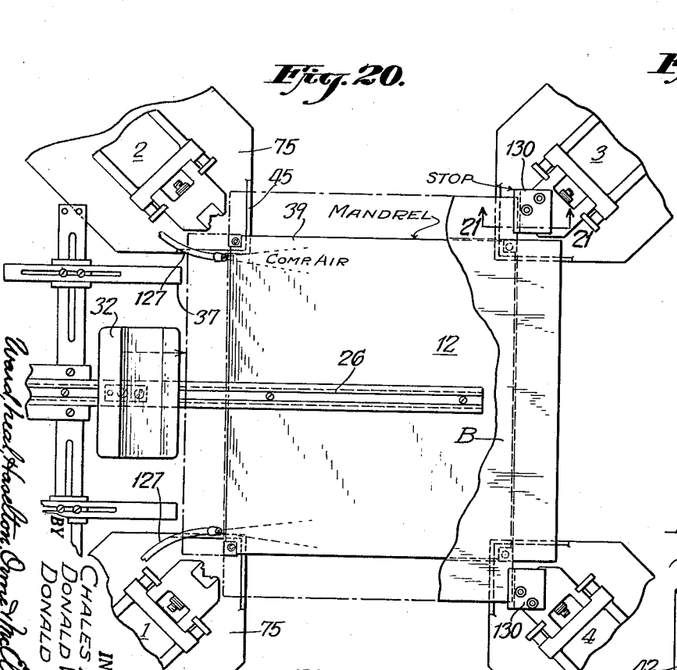
FIG. 20 is a fragmentary plan view illustrating portions of the delivery device, the mandrel, and the ejecting means in relationship to the stay applying apparatus.
Figure 22:
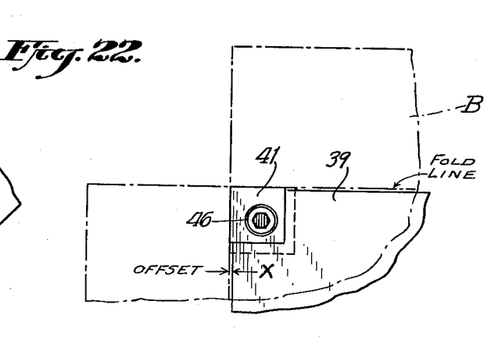
FIG. 22 is a fragmentary plan view illustrating the set-back in relationship between the mandrel and the supporting posts therefor which contribute to the stripping of the form box from the mandrel.

As has been stated heretofore, after the blanks are cornered and stayed they are stripped from the mandrel by the shoulders 69 on two of the pads 66 (FIGS. 16 and 17) which are then pivoted to a horizontal position thus releasing the formed box in mid-air above the mandrel. At this point, air jets are activated by control means (not shown) to blow the box on to a suitable take-off conveyor. Thus, the air jets may conveniently emanate from a pair of pipes 127 mounted on the sides of two of the housings 75 as shown in FIGS. 19d and 20, the former figure also illustrating a convenient take-off conveyor 129. To facilitate the stripping of the box from the mandrel, the edges of the plate 39 are slightly set back from the exterior surfaces of the posts 41, as best illustrated in FIG. 22 by the letter $x$.

It will be appreciated by those persons skilled in the art, that box tops have a slightly greater perimeter than the boxes themselves so that the sides of the tops may telescope over the sides of the boxes. Accordingly, to adapt the present machine for the manufacture of box tops, it is simply necessary to adjust the vertical posts 41 to separate the same slightly and then to insert shims 129 (FIGS. 23 and 24) on the shoulders 42 between the cornered surfaces 40 of the plate 39 and the posts, as clearly shown in FIGS. 23 and 24. Thus box tops for a particular size box may be manufactured with the same size plate 39 as was used in the manufacture of the boxes themselves.

Figure 21:
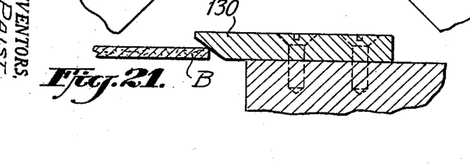
FIG. 21 is a fragmentary sectional view taken along the lines 21—21 of FIG. 20.

By way of generally reviewing the operation of the overall machine, a scored cornered blank is fed from a feeder 11 on to a mandrel comprising the plate 39 and vertical posts 41. To prevent overfeed, suitable stops 130 are provided atop the housing 75 remote from the feeder 11, as shown in FIG. 20; FIG. 21 illustrating the cross-sectional shape of the stops which help to position the blanks B. As the blank comes to rest on the mandrel, the box forming means 12 descend towards the blank folding the side flaps thereof downwardly and engaging the lower edge surfaces of at least two opposed flaps. In the meantime, the stay feeding means will have been actuated to advance a section of stay into the cutting heads which are then actuated to cut, shape and apply the sections of stay to the adjacent margins of the side flaps. The box forming means are then utilized to strip the formed cornered box from the mandrel and to release it for ejection by the air jets released through the pipes 127. In this connection, FIG. 19 illustrates a blank being delivered to the mandrel comprising the plate 39 and the vertical posts 41. FIG. 19a illustrates the retraction of delivering rack 26 and also shows the blank position on the mandrel. FIG. 19b shows the box after it has been formed but before it has been stripped from the mandrel and also shows the box in phantom lines having been stripped and released in midair. FIG. 19c illustrates the horizontal position of the rods 61 and the pads 66 as the box is released, and FIG. 19d illustrates the movement of the box to a take-off conveyor under the influence of the air jets.

It has been stated heretofore that the machine of the present invention is adapted for the manufacture of boxes of many different sizes and that the change-over from one box size to another may be effected quickly and simply. Referring to FIG. 4, it will be seen that the beds 76 are provided with depending apertured lugs 131 slideably carried on horizontal rods 132. Two pairs of these rods 132 are provided and each pair is in turn supported on a sub-frame 134 having depending lugs 135 slideably supported on horizontal rods 136 extending in planes perpendicular to the planes of the rods 132 and the ends of which are mounted in journal bearings 138 constituting integral portions of the frame 10. A counter-threaded rod 137 having a manually operable control wheel 139 at one end thereof and being journaled at its ends and center in bearings 143 on the frame 10, passes through one of the longitudinal axes of the frame and threadedly engages a head 140 depending from each of the sub-frames 134. It will be appreciated therefore that upon rotation of the hand wheel 139, the sub-frames 134, will move along the rods 136 in a direction towards or away from one another, depending upon the direction of rotation of the wheel 139. Thus the housings 79 containing the stay feeding and applying means for two of the quadrants, for example quadrants 1 and 2, may be moved towards or away from the housings 75 in the quadrants 3 and 4 while the last mentioned housings are simultaneously moved towards or away from the housings in the first two quadrants. In this connection, it will be recalled that the posts 41 which support the plate 39 are maintained vertical by guides 45 constituting a part of the housing 75 so that the posts 41 move along with their respective housings. As the machine is set up for each new box size, a particular plate 39 corresponding to that size is mounted on the posts 41.

The housings 75 in the quadrants 1 and 4 are similarly mutually adjustable relatively to the housings 75 in the quadrants 2 and 3. To this end, each of the subframes 134 serves to journal a counter-threaded rod 141 each of which threadedly engages heads 140a depending from the beds 76 carried by the particular sub-frames 134. One end of each of the rods 141 carries a bevel gear 142 which engages a bevel gear 144 carried by a shaft 145 which in turn carries a manually operable wheel 146. It will be appreciated that rotation of the wheel 146 through the right angle drives constituted by the respective sets of bevel gears will effect movement of the housings 75 in quadrants 1 and 4 toward or away from those in quadrants 2 and 3, while at the same time, the housings in quadrants 2 and 3 will move toward or away from those in quadrants 1 and 4. Thus, within the limits of the sizes of the machine parts, the mandrel may be adjusted to accommodate box blanks of a considerable number of sizes, either square or rectangular, and the adjustments of the mandrel and housings are accomplished merely by rotation of the hand wheels 139 and 146. The position of the pads 66 are manually adjusted relatively to the slides 61 and the blocks 56 are adjusted relatively to the beams 52 and 52a. The feeder plate 32 is positioned as desired on the rack 26 (FIG. 6) to accommodate the desired size blank and, as has been mentioned, the length of stays to be applied is controlled by adjustment of the screws 116 which in turn control the throw of the hydraulic rams 77 and thus the extent of annular rotation of the stay feeding sprockets 84 for each cycle of operation.

From the foregoing description, it will be seen that the machine of the present invention may be quickly and easily adjustable to accommodate box blanks of a number of different sizes, and in fact actual change-overs have been accomplished in as little as 10 minutes on machines manufactured in accordance with the present disclosure. It will further be seen that the present machine folds, stays and ejects boxes rapidly and automatically, the stays being applied simultaneously to each corner of the box, and that the stays are fed by sprockets which rotate only in a direction to propel or advance the stays, thus preventing damage and disfiguration to the surface of the stays by scraping over it on a return excursion.

It is believed that the construction and operation of our novel box making machine will now be understood, and that the advantages of our invention will be fully appreciated by those persons skilled in the art.

What is claimed and desired to be secured by Letters Patent is:

1. In a box making machine of the class described, forming means for bending the side flaps of a scored and cornered box blank into set-up condition for the reception of metal stays at the corners thereof, said means comprising a stationary mandrel for supporting the body of a box blank with the flaps overextending same, a frame movable relatively to said mandrel and carrying slide means for contacting the body of said blank upon movement of said frame towards said mandrel, said slide means sliding relatively to said frame upon further movement of said frame towards said mandrel, flap bending means movable relatively to said slide means and operable upon said further movement to fold said flaps along the edges of said mandrel into set-up condition and means for applying metal stays simultaneously to adjacent regions of said set-up side flaps to form box corners.

2. In a box making machine of the class described, forming means for bending the side flaps of a scored and cornered box blank into set-up condition for the reception of metal stays at the corners thereof, said means comprising a stationary mandrel for supporting the body of a box blank with the flaps overextending same, a frame movable in a direction towards said mandrel and carrying slide means for contacting the body of said blank upon movement of said frame towards said mandrel whereby further movement of said slide means in a direction towards said mandrel is prevented, said slide means sliding relatively to said frame upon further movement of said frame towards said mandrel, flap bending means pivotally connected to said slide means and operable upon said further movement to fold said flaps along the edges of said mandrel into set-up condition and means for applying metal stays simultaneously to adjacent regions of said set-up side flaps to form box corners.

3. In a box making machine of the class described, forming means for bending the side flaps of a scored and cornered box blank into set-up condition for the reception of metal stays at the corners thereof, said means comprising a stationary mandrel for supporting the body of a box blank with the flaps overextending same, a frame movable relatively to said mandrel and carrying slide means for contacting the body of said blank upon movement of said frame towards said mandrel whereby further movement of said slide means towards said mandrel is prevented, said slide means sliding relatively to said frame upon further movement of said frame towards said mandrel, flap bending means pivotally connected to said slide means and operable upon said further movement to fold said flaps along the edges of said mandrel into set-up condition, and detent means operable when said flaps reach set-up condition to releasably hold said slide means against movement relatively to said frame.

4. In a box making machine of the class described, forming means for bending the side flaps of a scored and cornered box blank into set-up condition for the reception of metal stays at the corners thereof, said means comprising a stationary mandrel for supporting the body of a box blank with the flaps overextending same, a frame movable relatively to said mandrel and carrying slide means for contacting the body of said blank upon movement of said frame towards said mandrel whereby further movement of said slide means towards said mandrel is prevented, said slide means sliding relatively to said frame upon further movement thereof towards said mandrel, flap bending pads pivotally connected to said slide means, and links pivoted to said pads and said frame and operable upon said further movement to pivot said pads about said pivotal connections causing same to fold said flaps along the edges of said mandrel into set-up condition.

5. In a box making machine of the class described, the combination comprising: forming means for bending the side flaps of a scored and cornered box blank into set-up condition for the reception of metal stays at the corners thereof, said forming means including a mandrel for supporting the body of a box blank with the flaps overextending same, a frame movable relatively to said mandrel and carrying slide means for contacting the body of said blank upon movement of said frame towards said mandrel whereby further movement of said slide means towards said mandrel is prevented, said slide means sliding relatively to said frame upon further movement of said frame towards said mandrel, and flap bending means movable relatively to said slide means and operable upon said further movement to fold said flaps along the edges of said mandrel into set-up condition; means for feeding box blanks individually to said forming means; means for applying metal stays simultaneously to adjacent regions of said set-up side flaps to form box corners; and ejecting means operable in timed relation to the operation of said stay applying means for ejecting the box.

6. Apparatus according to claim 5, wherein said ejection means include means directing a current of air at the ejected box to urge the same towards a takeoff station.

7. In a box making machine of the class described, forming means for bending the side flaps of a scored and cornered box blank into set-up condition for the reception of metal stays at the corners thereof, said means comprising a mandrel for supporting the body of a box blank with the flaps overextending same, a frame movable relatively to said mandrel and carrying slide means for contacting the body of said blank upon movement of said frame towards said mandrel, said slide means sliding relatively to said frame upon further movement of said frame towards said mandrel, flap bending means operable upon said further movement to fold said flaps along the edges of said mandrel into set-up condition, means for applying metal stays simultaneously to adjacent regions of said setup side flaps to form box corners, and means on said flap bending means for engaging the edges of opposed flaps to strip the formed box from the mandrel after the stays have been applied.

8. In a box making machine of the class described, forming means for bending the side flaps of a scored and cornered box blank into set-up condition for the reception of metal stays at the corners thereof, said means comprising a mandrel for supporting the body of a box blank with the flaps overextending same, and a frame movable towards and away from said mandrel and carrying means for bending said flaps along portions of said mandrel into set-up condition upon movement thereof in one direction, said bending means having elements engaging said flaps and stripping the formed box from the mandrel upon movement of said frame in the other direction.

9. A machine according to claim 8, wherein said elements comprise shoulders engageable beneath the edges of said flaps when the latter are in set-up position.

10. In a box-making machine of the class described, forming means for bending the flaps of a scored and cornered box blank into set-up conditon for the reception of metal stays at the corner regions thereof, said means comprising a stationary mandrel for supporting the body of a box blank with the flaps over-extending same, a frame positioned above said mandrel and movable towards and away from said mandrel and carrying slide means for contacting the body of said blank upon movement of said frame towards said mandrel, said slide means sliding relatively ot said frame upon further movement of said frame toward said mandrel, means pivotally connected to said slide means for engaging and bending said flaps of said box blank upon said further movement of said frame to fold said flaps along the edges of said mandrel into set-up condition, said flap bending means including shoulders adapted to engage the end edges of said box blank flaps after the same are folded into set-up condition to strip the formed box off the mandrel upon movement of the frame in a direction away from the mandrel, means pivoting said flap bending means in a direction to release the end edges of the formed box while said frame moves away from said mandrel, and ejection means directing a current of air at the released box to urge the same towards a take-off station.

11. In a box making machine of the class described; forming means for bending the side flaps of a scored and cornered box blank into set-up condition; means for feeding such box blanks individually to said forming means; and metal corner stay feeding and applying means comprising a rotatable sprocket for engaging and advancing metal stay of an indefinite length a predetermined distance into position for a portion thereof to be appplied to a corner of the set-up box, control means including a double acting hydraulic ram, means effecting rotation of said sprocket upon actuation of said ram in one direction, means operable in timed relation to operation of said ram for restraining movement of said sprocket upon actuation of said ram in the other direction, clutch means permitting rotation of said sprocket to advance said metal stay by said ram and then permitting retraction of said ram while said sprocket is restrained, and die means for cutting and applying a length of said metal stay to a corner of said box.

12. In a box making machine of the class described; forming means for bending the side flaps of a scored and cornered box blank into set-up condition; means for feeding such box blanks individually to said forming means; and metal corner stay feeding and applying means comprising a rotatable sprocket for engaging and advancing metal stay of an indefinite length a predetermined distance into posiiton for a portion thereof to be applied to a corner of the set-up box, control means including a rack and pinion and a hydraulic ram for reciprocating said rack, clutch means permitting rotation of said sprocket to advance said metal stay by said control means and then permitting retracting of said ram, brake means operable in timed relation to movement of said ram for engaging and retaining said sprocket in its advanced position during retraction of said ram, die means movable relatively to said box for cutting and applying a length of said stay to a corner of said box, and a trackway movable with said die means for guiding said stay into position to be acted upon by said die means.

References Cited in the file of this patent
UNITED STATES PATENTS

| | | |
|---|---|---|
| 914,358 | Lyman | Mar. 2, 1909 |
| 1,614,522 | Clark et al. | Jan. 18, 1927 |
| 1,915,976 | Brodsky | June 27, 1933 |
| 2,174,585 | Kotzich | Oct. 3, 1939 |
| 2,332,644 | Junkin | Oct. 26, 1943 |
| 2,641,973 | Straw | June 16, 1953 |
| 2,925,758 | Beetz | Feb. 23, 1960 |